US009653945B2

(12) United States Patent
Mishra et al.

(10) Patent No.: US 9,653,945 B2
(45) Date of Patent: May 16, 2017

(54) CONVERTER BETWEEN SOLAR PANEL, SOURCE AND LOAD

(71) Applicant: PHILIPS LIGHTING HOLDING B.V., Eindhoven (NL)

(72) Inventors: Priya Ranjan Mishra, Eindhoven (NL); Rakeshbabu Panguloori, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/038,191

(22) PCT Filed: Dec. 30, 2014

(86) PCT No.: PCT/EP2014/079476
§ 371 (c)(1),
(2) Date: May 20, 2016

(87) PCT Pub. No.: WO2015/104209
PCT Pub. Date: Jul. 16, 2015

(65) Prior Publication Data
US 2016/0308387 A1    Oct. 20, 2016

(30) Foreign Application Priority Data
Jan. 8, 2014  (EP) .................................... 14150454

(51) Int. Cl.
H01M 10/46        (2006.01)
H02J 7/35         (2006.01)
(Continued)

(52) U.S. Cl.
CPC ............... *H02J 7/355* (2013.01); *H02J 1/10* (2013.01); *H02J 1/14* (2013.01); *H02J 7/007* (2013.01);
(Continued)

(58) Field of Classification Search
CPC .. H02J 7/0055; H02J 7/007; H02J 7/04; H02J 7/35
(Continued)

(56) References Cited

U.S. PATENT DOCUMENTS 5,479,557 A    12/1995  Ganz et al.
2008/0122518 A1*  5/2008  Besser .................... H02J 3/382
                                                    327/518
(Continued)

FOREIGN PATENT DOCUMENTS

CN    102013710 A    4/2011
FR    2986602 A1     8/2013
KR    1035705 B1     5/2011

OTHER PUBLICATIONS

Sun, Kai et al, "A Distributed Control Strategy Based on DEC Bus Signaling for Modular Photovoltaic Generation Systems With Battery Energy Storage", IEEE.

*Primary Examiner* — Edward Tso

(57) ABSTRACT

A system, comprising a solar circuit (2), a coupling circuit (1), a converter circuit (5), a source circuit (3), and a load circuit (4), wherein the coupling circuit (1) couples in a first, charging mode the solar circuit (2) to the source circuit (3) via the converter circuit (5) and couples in a second, feeding mode the source circuit (3) to the load circuit (4) via the converter circuit (5). A power flow through the converter circuit (5) has a same direction in both modes. In the first mode, a charging current is guided from the solar circuit (2) to the source circuit (3) via the converter circuit (5) for charging the source circuit (3). In the second mode, a feeding current is guided from the source circuit (3) to the load circuit (4) via the converter circuit (5) for feeding the load circuit (4). The coupling circuit (1) may comprise a first switch (11) and a second switch (12) and a control circuit (13-21) for controlling the first and second switches (11, 12).

(Continued)

The control circuit (13-21) may comprise generators (13, 15), a comparator (14), detectors (16, 17, 19), a manager (18) and a regulator (20).

13 Claims, 2 Drawing Sheets

(51) Int. Cl.
| | | |
|---|---|---|
| *H02J 1/10* | (2006.01) | |
| *H02J 1/14* | (2006.01) | |
| *H05B 33/08* | (2006.01) | |
| *H05B 37/02* | (2006.01) | |
| *H02J 7/00* | (2006.01) | |
| *H02J 3/38* | (2006.01) | |

(52) U.S. Cl.
CPC ............ *H02J 7/35* (2013.01); *H05B 33/0842* (2013.01); *H05B 37/0227* (2013.01); *H02J 3/385* (2013.01)

(58) Field of Classification Search
USPC .................. 320/101, 103, 107, 138, 140
See application file for complete search history.

(56) References Cited

U.S. PATENT DOCUMENTS

| | | | |
|---|---|---|---|
| 2009/0262523 A1 | 10/2009 | Chen | |
| 2011/0273130 A1 | 11/2011 | Lee et al. | |
| 2012/0176080 A1* | 7/2012 | Uchihashi | A62C 3/16 320/101 |
| 2014/0265596 A1* | 9/2014 | Yuan | H02J 3/382 307/69 |
| 2015/0171665 A1* | 6/2015 | Humphrey | H02M 1/10 307/64 |
| 2016/0043597 A1* | 2/2016 | Kuwahara | H02J 7/35 307/23 |

* cited by examiner

US 9,653,945 B2

CONVERTER BETWEEN SOLAR PANEL, SOURCE AND LOAD

CROSS-REFERENCE TO PRIOR APPLICATIONS

This application is the U.S. National Phase application under 35 U.S.C. §371 of International Application No. PCT/EP2014/079476, filed on Dec. 30, 2014, which claims the benefit of European Patent Application No. 14150454.8, filed on Jan. 8, 2014. These applications are hereby incorporated by reference herein.

FIELD OF THE INVENTION

The invention relates to a coupling circuit for in a first mode coupling a solar circuit to a source circuit and for in a second mode coupling the source circuit to a load circuit. The invention further relates to a system and to a method.

Examples of such a solar circuit are solar panels. Examples of such a source circuit are chargeable batteries. Examples of such a load circuit are lamps.

BACKGROUND OF THE INVENTION

The article "A Distributed Control Strategy based on DC Bus Signaling for Modular Photovoltaic Generation Systems with Battery Energy Storage" by Kai Sun, Li Zhang, Yan Xing, Josep M. Guerrero discloses in its FIG. 2 a coupling circuit for in a first mode coupling a solar circuit to a source circuit via a first converter circuit and for in a second mode coupling the source circuit to a load circuit via a second converter circuit. In other words, this coupling circuit disadvantageously requires two different converter circuits.

US 2009/0262523A1 discloses a light emitting diode device powered by a solar cell, wherein there are respective a first DC/DC converter and a second DC/DC converter respective for the charging of the rechargeable cell unit from the solar cell unit and for the discharging of the rechargeable cell unit to the LED illumination element.

FR2986602A1 discloses two converters 51 and 61, wherein the converter that is actually discharging the battery 4 is selectively switched between the two converters 51 and 61.

SUMMARY OF THE INVENTION

It is an object of the invention to provide an improved system and an improved method.

According to a first aspect, a system is provided comprising a solar circuit (2), a coupling circuit (1), a converter circuit (5), a source circuit (3), and a load circuit (4), wherein the coupling circuit (1) is adapted for in a first mode coupling the solar circuit (2) to the source circuit (3) via the converter circuit (5) and for in a second mode coupling the source circuit (3) to the load circuit (4) via the converter circuit (5), a power flow through the converter circuit (5) having a same direction in both modes.

The system allows in the first (charging) mode the solar circuit to be coupled to the source circuit and allows in the second (feeding) mode the source circuit to be coupled to the load circuit, in both modes via one and the same converter circuit. This is a great advantage.

In both modes, a power flow through the converter circuit should have a same direction: In the first mode, a first power flow goes from the solar circuit to the source circuit, and in the second mode a second power flow goes from the source circuit to the load circuit, each time through the converter circuit in a same direction. As a result, a basic and generally available converter circuit can be used. This is another great advantage.

Said article, by using in its FIG. 1 eight different converter circuits and by using in its FIG. 2 six different converter circuits strongly points away from using one and the same converter circuit.

As a result, the improved system will allow coupling solar circuits, source circuits and load circuits to become less expensive. This will allow such systems to be introduced easier and faster, and this will reduce an amount of produced $CO_2$ in the world, which is of the utmost importance. Further, a significantly reduced component count will contribute to sustainability.

The converter circuit may comprise one converter such as for example a boost converter or may comprise two or more converters operating in an interleaved way such as for example two boost converters operating at a 180° phase-shift or three boost converters operating at 120° phase-shifts etc. The solar circuit may comprise one or more photovoltaic panels or solar panels. The source circuit may comprise one or more chargeable batteries. The load circuit may comprise one or more lamps, such as light emitting diode lamps. One or more lamps may comprise a driver or may be coupled to a driver. The load circuit may also comprise a bus for coupling the lamps to the coupling circuit. Other kinds of circuits are not to be excluded.

An embodiment of the system is defined by the coupling circuit in the first mode guiding a charging current from the solar circuit to the source circuit via the converter circuit for charging the source circuit and in the second mode guiding a feeding current from the source circuit to the load circuit via the converter circuit for feeding the load circuit. One and the same converter circuit is used for guiding both the charging current and the feeding current.

An embodiment of the system is defined by the charging current and the feeding current being direct-current signals. Usually, the solar circuit and the source circuit produce DC signals. When converting DC signals into AC signals and vice versa, an energy efficiency is reduced. By using charging currents and feeding currents in the form of DC signals, a good energy efficiency will be reached.

An embodiment of the system is defined by comprising a first switch for in the first mode coupling an output of the solar circuit to an input of the converter circuit and for in the second mode coupling a terminal of the source circuit to the input of the converter circuit, and a second switch for in the first mode coupling an output of the converter circuit to the terminal of the source circuit and for in the second mode coupling the output of the converter circuit to an input of the load circuit.

The first and second switches can be any kind of switches, such as mechanical switches (low power loss) and electronic switches (long lifetime). A power flow through the converter circuit goes from the input of the converter circuit to the output of the converter circuit.

An embodiment of the system is defined by comprising a control circuit for controlling the first and second switches.

Preferably, the coupling circuit comprises the control circuit for controlling the first and second switches, whereby the control circuit forms a part of the coupling circuit.

An embodiment of the system is defined by the control circuit comprising a first generator for providing first and second control signals to the first and second switches.

Preferably, the respective first and second switches are controlled via the respective first and second control signals. The first (second) control signal for example defines in the first mode that a main contact and a first switching contact of the first (second) switch are to be connected, whereby the main contact and a second switching contact of the first (second) switch are disconnected. The first (second) control signal for example defines in the second mode that the main contact and the second switching contact of the first (second) switch are to be connected, whereby the main contact and the first switching contact of the first (second) switch are disconnected. The first and second control signals may be the same signal or may be different signals.

An embodiment of the system is defined by the control circuit comprising a comparator for comparing an output voltage of the solar circuit with a threshold value and for in response to a comparison result defining the first and second control signals. The threshold value may for example be chosen equal to one third of a maximum output voltage of the solar circuit at an open output of the solar circuit. In case the output voltage of the solar circuit is larger than the threshold value, the coupling circuit should be in the first (charging) mode. In case the output voltage of the solar circuit is smaller than the threshold value, the coupling circuit should be in the second (feeding) mode. Other threshold values are not to be excluded.

An embodiment of the system is defined by the control circuit comprising a second generator for providing a third control signal to the converter circuit. Preferably, the converter circuit is controlled via the third control signal. The third control signal for example defines a pulse width modulation of the converter circuit.

An embodiment of the system is defined by the control circuit comprising a first detector for detecting an output voltage and/or an output current of the solar circuit and/or a second detector for detecting a terminal voltage and/or a terminal current of the source circuit, and the control circuit comprising a manager for in the first mode in response to one or more detection results from the first and/or second detectors defining the third control signal. Preferably, in the first mode the converter circuit is controlled in response to the output voltage and/or output current of the solar circuit and/or the terminal voltage and/or terminal current of the source circuit.

An embodiment of the system is defined by the third control signal in the first mode defining a charging parameter. The first mode is a charging mode.

An embodiment of the system is defined by the control circuit comprising a third detector for detecting an input voltage supplied to the load circuit, and the control circuit comprising a regulator for in the second mode in response to a detection result from the third detector defining the third control signal. Preferably, in the second mode the converter circuit is controlled in response to the input voltage supplied to the load circuit. The input voltage supplied to the load circuit is equal to an output voltage of the converter circuit.

An embodiment of the system is defined by the third control signal in the second mode defining a feeding parameter. The second mode is a feeding mode.

According to a third aspect, a method is provided comprising a first step of in a first mode coupling a solar circuit to a source circuit via a converter circuit and a second step of in a second mode coupling the source circuit to a load circuit via the converter circuit, a power flow through the converter circuit having a same direction in both modes.

A basic idea is that one and the same converter circuit can be used for letting a solar circuit charge a source circuit and for letting the source circuit feed a load circuit.

A problem to provide an improved system has been solved. A further advantage is that an amount of produced $CO_2$ in the world can be reduced.

These and other aspects of the invention will be apparent from and elucidated with reference to the embodiments described hereinafter.

DETAILED DESCRIPTION OF EMBODIMENTS

It is provided a system, comprising a solar circuit, a coupling circuit, a converter circuit, a source circuit, and a load circuit, wherein
the coupling circuit is adapted for in a first mode coupling the solar circuit to the source circuit via the converter circuit and for in a second mode coupling the source circuit to the load circuit via the converter circuit, a power flow through the converter circuit having a same direction in both modes.

Figure 1:
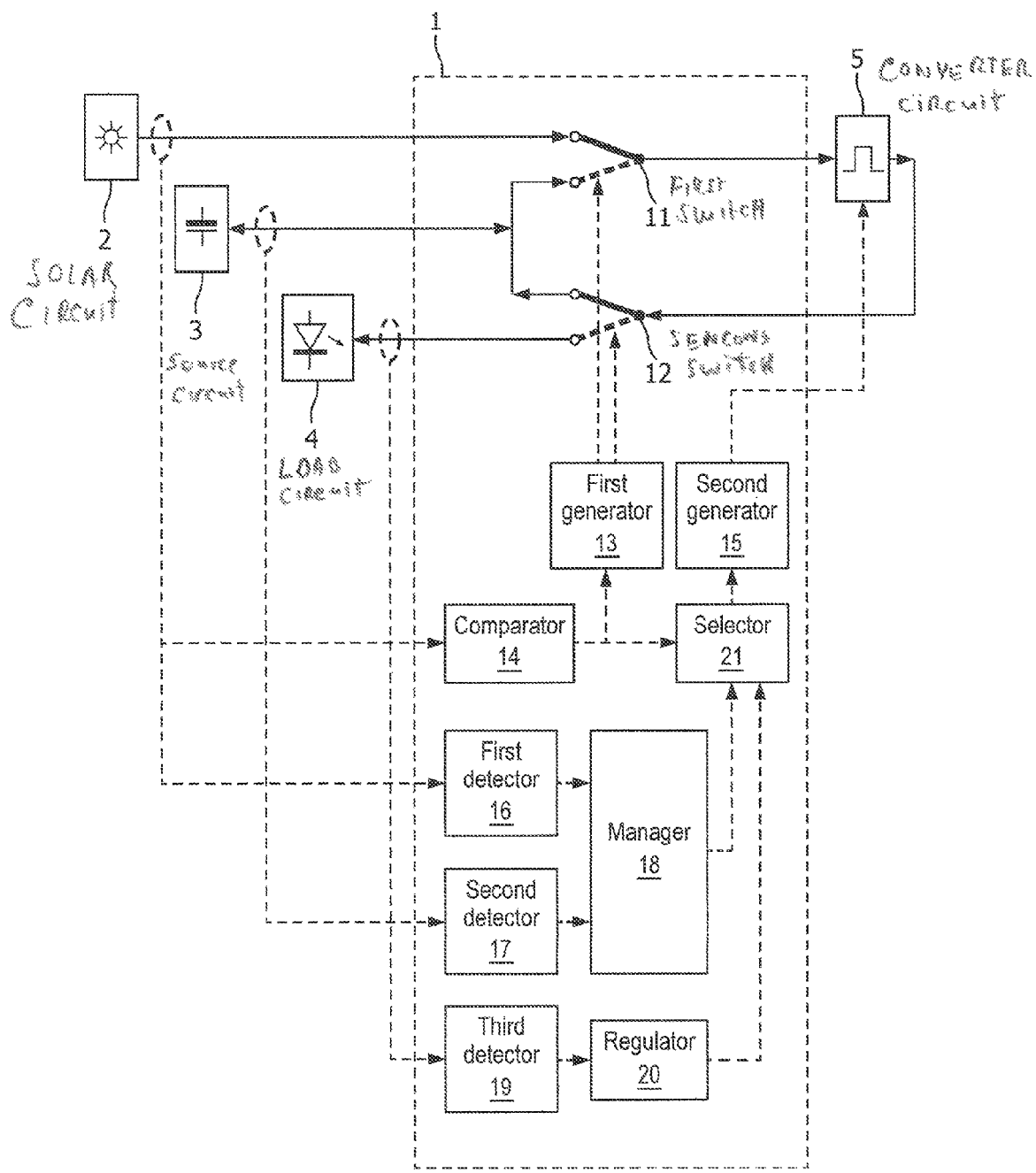
FIG. 1 shows an embodiment of a system.

In the FIG. 1, an embodiment of a system is shown. In general, the coupling circuit 1 is arranged for in a first mode coupling a solar circuit 2 to a source circuit 3 via a converter circuit 5 and for in a second mode coupling the source circuit 3 to a load circuit 4 via the converter circuit 5. A power flow through the converter circuit 5 has a same direction in both modes. The coupling circuit 1 in the first mode guides a charging current from the solar circuit 2 to the source circuit 3 via an input and an output of the converter circuit 5 in this particular order for charging the source circuit 3. The coupling circuit 1 in the second mode guides a feeding current from the source circuit 3 to the load circuit 4 via the input and the output of the converter circuit 5 in this particular order for feeding the load circuit 4. Preferably, the charging current and the feeding current are direct-current signals or DC signals.

More in particular, according to an exemplary embodiment, the coupling circuit 1 may comprise a first switch 11 with a main contact coupled to an input of the converter circuit 5 and with a first switching contact coupled to an output of the solar circuit 2 and with a second switching contact coupled to a terminal of the source circuit 3 for in the first mode coupling the output of the solar circuit 2 to the input of the converter circuit 5 and for in the second mode coupling the terminal of the source circuit 3 to the input of the converter circuit 5. And the coupling circuit 1 may comprise a second switch 12 with a main contact coupled to an output of the converter circuit 5 and with a first switching contact coupled to the terminal of the source circuit 3 and with a second switching contact coupled to an input of the load circuit 4 for in the first mode coupling the output of the converter circuit 5 to the terminal of the source circuit 3 and for in the second mode coupling the output of the converter circuit 5 to the input of the load circuit 4.

The solar circuit 2 comprises for example one or more photovoltaic panels or solar panels. The source circuit 3 comprises for example one or more chargeable batteries. The load circuit 4 comprises for example one or more lamps, such as light emitting diode lamps. The converter circuit 5 comprises for example one converter such as for example a boost converter or comprises for example two or more converters operating in an interleaved way such as for example two boost converters operating at a 180° phase-shift or three boost converters operating at 120° phase-shifts etc.

The coupling circuit 1 may further comprise a control circuit 13-21 for controlling the first and second switches 11, 12. The control circuit 13-21 may comprise a first generator 13 for providing first and second control signals to the first and second switches 11, 12. The control circuit 13-21 may comprise a comparator 14 for comparing an output voltage of the solar circuit 2 with a threshold value and for in response to a comparison result defining the first and second control signals. In case the output voltage of the solar circuit 2 is larger than the threshold value (first mode or charging mode), the comparator 14 provides a first comparison result (first fixed information) to the first generator 13. In response the first generator 13 provides the first and second control signals (for example logical zero) to the first and second switches 11, 12 such that in each switch 11, 12 the main contact is connected to the first switching contact. In case the output voltage of the solar circuit 2 is smaller than the threshold value (second mode or feeding mode), the comparator 14 provides a second comparison result (second fixed information) to the first generator 13. In response the first generator 13 provides the first and second control signals (for example logical one) to the first and second switches 11, 12 such that in each switch 11, 12 the main contact is connected to the second switching contact. In case the output voltage of the solar circuit 2 is equal to the threshold value, one of both options may be chosen.

The control circuit 13-21 may comprise a second generator 15 for providing a third control signal to the converter circuit 5. The control circuit 13-21 may comprise a first detector 16 for detecting an output voltage and/or an output current of the solar circuit 2 and/or a second detector 17 for detecting a terminal voltage and/or a terminal current of the source circuit 3. The control circuit 13-21 may comprise a manager 18 for in the first mode in response to one or more detection results from the first and/or second detectors 16, 17 defining the third control signal. The third control signal in the first mode defines a charging parameter, such as for example an amplitude of the charging current or an amplitude of a charging voltage or an amount of charging power.

The control circuit 13-21 may comprise a third detector 19 for detecting an input voltage supplied to the load circuit 4. The control circuit 13-21 may comprise a regulator 20 for in the second mode in response to a detection result from the third detector 19 defining the third control signal. The third control signal in the second mode defines a feeding parameter such as for example an amplitude of the feeding current or an amplitude of a feeding voltage or an amount of feeding power.

The manager 18 provides a managing result (third varying information) to a first input of a selector 21, and the regulator 19 provides a regulating result (fourth varying information) to a second input of the selector 21. The selector 21 is controlled via the comparison result from the comparator 14 and connects in the first mode the first input to its output and connects in the second mode the second input to its output. This output is coupled to an input of the second generator 15. The third control signal for example defines a pulse width modulation of the converter circuit 5 to control the charging process in the first mode or the feeding process in the second mode.

The manager 18 for example performs maximum power point tracking for the solar circuit 2 and battery management for the source circuit 3. The regulator 20 for example performs DC bus regulation for the converter circuit 5 and for a DC bus located between the output of the converter circuit 5 (in the second, feeding mode) and one or more lamps in the load circuit 4.

Alternatively, an input of the comparator 14 may be coupled to an output of the first detector 16. Alternatively, the selector 21 may be left out by giving the manager 18 and the regulator 19 each an on/off state controlled via the comparison result. Alternatively, the comparator 18 may be replaced by a light detector: In case more light than a threshold amount is detected, the first, charging mode is selected, and in case less light than the threshold amount is detected, the second, feeding mode is selected. Alternatively, the generators 13 and 15 may be combined. Alternatively, the manager 18 and the regulator 19 may be combined into or replaced by a processing circuit, in which case the comparator 14, the detectors 16, 17 and 19, the selector 21 and the generators 13 and 15 may also be realized via this processing circuit. In the control circuit 13-21, each block may be divided into sub-blocks and two or more blocks may be combined into a larger block etc. Generally, first and second units can be coupled directly without a third unit being in between or can be coupled indirectly via a third unit etc.

The fact that the coupling circuit 1 is arranged for in a first mode coupling a solar circuit 2 to a source circuit 3 via a converter circuit 5 corresponds with in the first mode disconnecting the source circuit 3 from the load circuit 4. The fact that the coupling circuit 1 is arranged for in a second mode coupling the source circuit 3 to a load circuit 4 via the converter circuit 5 corresponds with in the second mode disconnecting the solar circuit 2 from the source circuit 3. Both first and second switches 11 and 12 are usually operated synchronously.

Figure 2:
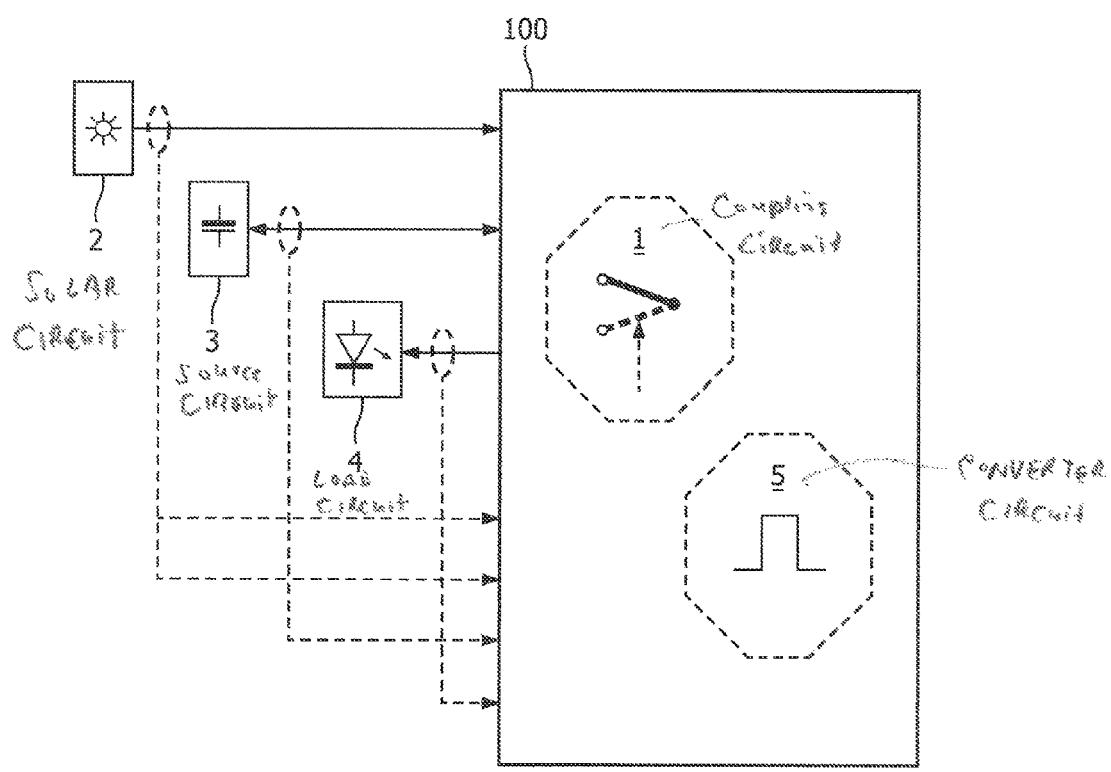
FIG. 2 shows another embodiment of a system.

In the FIG. 2, an embodiment of a system 100 is shown. The system 100 comprises the coupling circuit 1 as described in greater detail at the hand of the FIG. 1 and further comprises the converter circuit 5. The solar circuit 2, the source circuit 3 and/or the load circuit 4 may form part of the system 100 as well, or not.

Substantially, from dawn till dusk, usually the coupling circuit 1 will be in the first, charging mode. Substantially, from dusk till dawn, usually the coupling circuit 1 will be in the second, feeding mode. This way, during the day, a battery coupled to a solar panel via a boost converter can be charged by the solar panel, and during the night, the battery coupled to streetlamps via the same boost converter can feed the streetlamps. These streetlamps are coupled to the boost converter battery via a DC bus, to avoid AC-to-DC conversions and/or DC-to-AC conversions. In case the coupling circuit 1 is in the first (second) mode, the system 100 will be in the first (second) mode too.

Summarizing, a coupling circuit 1 couples in a first, charging mode a solar circuit 2 to a source circuit 3 via a converter circuit 5 and couples in a second, feeding mode the source circuit 3 to a load circuit 4 via the converter circuit 5. A power flow through the converter circuit 5 has a same direction in both modes. In the first mode, a charging current is guided from the solar circuit 2 to the source circuit 3 via the converter circuit 5 for charging the source circuit 3. In the second mode, a feeding current is guided from the source circuit 3 to the load circuit 4 via the converter circuit 5 for feeding the load circuit 4. The coupling circuit 1 may comprise a first switch 11 and a second switch 12 and a control circuit 13-21 for controlling the first and second switches 11, 12. The control circuit 13-21 may comprise generators 13, 15, a comparator 14, detectors 16, 17, 19, a manager 18 and a regulator 20.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A system, comprising a solar circuit, a coupling circuit, a converter circuit, a source circuit, and a load circuit, wherein
    the coupling circuit in a first mode couples the solar circuit to the source circuit using the converter circuit and in a second mode couples the source circuit to the load circuit using the converter circuit, a power flow through the converter circuit having a same direction in both modes.

2. The system as defined in claim 1, wherein the coupling circuit in the first mode guides a charging current from the solar circuit to the source circuit using the converter circuit for charging the source circuit and in the second mode guides a feeding current from the source circuit to the load circuit using the converter circuit for feeding the load circuit.

3. The system as defined in claim 2, wherein the charging current and the feeding current are direct-current signals.

4. The system as defined in claim 1, wherein the coupling circuit comprises
    a first switch in the first mode couples an output of the solar circuit to an input of the converter circuit and in the second mode couples a terminal of the source circuit to the input of the converter circuit, and
    a second switch in the first mode couples an output of the converter circuit to the terminal of the source circuit and in the second mode couples the output of the converter circuit to an input of the load circuit.

5. The system as defined in claim 4, wherein the coupling circuit comprises
    a control circuit for controlling the first and second switches.

6. The system as defined in claim 5, wherein the control circuit comprises a first generator for providing first and second control signals to the first and second switches.

7. The system as defined in claim 6, wherein the control circuit comprises a comparator to compare an output voltage of the solar circuit with a threshold value and for in response to a comparison result defines the first and second control signals.

8. The system as defined in claim 5, wherein the control circuit comprises a second generator to provide a third control signal to the converter circuit.

9. The system as defined in claim 8, wherein the control circuit comprises a first detector to detect an output voltage and/or an output current of the solar circuit and/or a second detector to detect a terminal voltage and/or a terminal current of the source circuit, and the control circuit comprising a manager for in the first mode in response to one or more detection results from the first and/or second detectors defines the third control signal.

10. The system as defined in claim 9, wherein the third control signal in the first mode defines a charging parameter.

11. The system as defined in claim 8, wherein the control circuit comprises a third detector to detect an input voltage supplied to the load circuit, and the control circuit comprising a regulator for in the second mode in response to a detection result from the third detector defines the third control signal.

12. The system as defined in claim 11, wherein the third control signal in the second mode defines a feeding parameter.

13. A method comprising:
    a first step in a first mode couples a solar circuit to a source circuit using a converter circuit and a second step of in a second mode couples the source circuit to a load circuit using the converter circuit, a power flow through the converter circuit having a same direction in both modes.

* * * * *